(12) United States Patent
Marron et al.

(10) Patent No.: US 10,401,499 B2
(45) Date of Patent: Sep. 3, 2019

(54) LASER BEAM PROJECTION SYSTEM WITH DYNAMIC PHASE COMPENSATION

(71) Applicant: Raytheon Company, Waltham, MA (US)

(72) Inventors: Joseph Marron, Manhattan Beach, CA (US); Maurice J. Halmos, Encino, CA (US); Justin S. Grayer, Arlington Heights, IL (US); Gamze Erten, Agoura Hills, CA (US); David N. Sitter, Jr., Torrance, CA (US)

(73) Assignee: Raytheon Company, Waltham, MA (US)

( * ) Notice: Subject to any disclaimer, the term of this patent is extended or adjusted under 35 U.S.C. 154(b) by 752 days.

(21) Appl. No.: 15/072,214

(22) Filed: Mar. 16, 2016

(65) Prior Publication Data

US 2017/0269214 A1    Sep. 21, 2017

(51) Int. Cl.
*H04N 7/18* (2006.01)
*G01S 17/89* (2006.01)
(Continued)

(52) U.S. Cl.
CPC .......... *G01S 17/89* (2013.01); *F41H 13/0062* (2013.01); *G01P 3/36* (2013.01);
(Continued)

(58) Field of Classification Search
USPC ........................................................ 356/27
See application file for complete search history.

(56) References Cited

U.S. PATENT DOCUMENTS 5,780,838 A    7/1998  Livingston et al.
5,780,839 A    7/1998  Livingston
(Continued)

FOREIGN PATENT DOCUMENTS

CN     104034416 A    9/2014
EP     0899586 A2     3/1999

OTHER PUBLICATIONS

Yan, Meng, Optics Communications Nov. 1, 2018 426, Elsevier B.V.*

(Continued)

*Primary Examiner* — William C Vaughn, Jr.
*Assistant Examiner* — Daniel Tekle

(57) ABSTRACT

A laser beam projection system builds on a coherent imaging to project a tightly focused laser beam onto a remote object. Coherent flood illumination and local oscillator (LO) illumination are based on one master oscillator. The coherent flood illumination is directed toward a remote object, with a second laser beam directed onto an aimpoint on the same object. A Doppler sensor provides Doppler shift data used to produce Doppler-shifted LO illumination received by a focal plane array, together with the return flood illumination. Interference between the Doppler-shifted LO illumination and the return flood illumination facilitates imaging the object despite the velocity. The wavefront error of the flood illumined remote object image is computed and compared to the desired wavefront of the second laser beam at the aimpoint, with the difference applied to a deformable mirror to shape the second laser beam wavefront for obtaining a desired aimpoint intensity profile.

25 Claims, 9 Drawing Sheets

(51) Int. Cl.
| | | |
|---|---|---|
| H01S 3/00 | (2006.01) | |
| H04N 5/33 | (2006.01) | |
| G01S 7/48 | (2006.01) | |
| G01P 3/36 | (2006.01) | |
| G01S 17/58 | (2006.01) | |
| F41H 13/00 | (2006.01) | |
| G01S 17/66 | (2006.01) | |
| G01S 7/481 | (2006.01) | |
| G01S 7/497 | (2006.01) | |
| G01S 7/491 | (2006.01) | |

(52) U.S. Cl.
CPC .......... *G01S 7/4804* (2013.01); *G01S 7/4812* (2013.01); *G01S 7/497* (2013.01); *G01S 7/4917* (2013.01); *G01S 17/58* (2013.01); *G01S 17/66* (2013.01); *H01S 3/0071* (2013.01); *H04N 5/33* (2013.01); *H04N 7/183* (2013.01)

(56) References Cited

U.S. PATENT DOCUMENTS

| | | | |
|---|---|---|---|
| 5,900,620 A | | 5/1999 | Livingston |
| 6,115,123 A * | | 9/2000 | Stappaerts .............. G01S 7/486 250/201.9 |
| 6,343,766 B1 | | 2/2002 | Livingston |
| 7,342,651 B1 * | | 3/2008 | Woolfson ................ G01S 7/484 356/28 |
| 7,405,834 B1 * | | 7/2008 | Marron ............... F41H 13/0062 356/450 |
| 7,626,152 B2 | | 12/2009 | King et al. |
| 8,068,235 B1 | | 11/2011 | Marron et al. |
| 8,218,589 B1 | | 7/2012 | Saunders |
| 8,362,410 B2 | | 1/2013 | King et al. |
| 8,415,600 B2 | | 4/2013 | Hutchin |
| 8,748,857 B2 | | 6/2014 | King et al. |
| 8,755,036 B2 | | 6/2014 | Hutchin |
| 8,972,163 B2 | | 3/2015 | Green et al. |
| 2002/0153497 A1 | | 10/2002 | Pepper et al. |
| 2011/0103410 A1 | | 5/2011 | Hutchin |

OTHER PUBLICATIONS

By: Tyson, Robert K. Series: Series in Optics and Optoelectronics. Edition: 3rd ed. Boca Raton, FL : CRC Press. 2011 (Year: 2011).*

International Search Report and Written Opinion for PCT/US2017/019350, European Patent Office, dated May 19, 2017.

Donald J. Link and Richard St. John, "Simulation and modeling of high energy laser systems," Laser Technologies for Defense and Security, Proceedings of SPIE, vol. 5414 (SPIE, Bellingham, WA), 2004, pp. 26-40.

Geoffrey E. Forden, "The Airborne Laser," IEEE Spectrum, Sep. 1997, pp. 40-49, XP-0000740482.

A.E. Siegman, "The Antenna Properties of Optical Heterodyne Receivers", Proceedings of the IEEE, vol. 54, No. 10, Oct. 1966, 7 pages.

David N. Sitter, Jr. et al., "High-Performance Beam Director for High-Power Laser Systems or Other Systems," U.S. Appl. No. 15/176,009, filed Jun. 7, 2016, 34 pages.

Joseph Marron, et al., "System for Coherent Imaging in Dynamic Engagements," U.S. Appl. No. 14/988,476, filed Jan. 5, 2016, 25 pages.

Foreign Communication From a Related Counterpart Application, PCT Application No. PCT/US2016/062624, International Search Report dated Feb. 28, 2017, 7 pages.

Foreign Communication From a Related Counterpart Application, PCT Application No. PCT/US2016/062624, Written Opinion dated Feb. 28, 2017, 6 pages.

Siegman, "The Antenna Properties of Optical Heterodyne Receivers," Proceedings of the IEEE, vol. 54 No. 10; (Oct. 1966); pp. 1350-1356.

* cited by examiner

LASER BEAM PROJECTION SYSTEM WITH DYNAMIC PHASE COMPENSATION

TECHNICAL FIELD

The present disclosure is directed in general to laser beam projection using coherent imaging, and, more particularly, to dynamic phase compensation of an outgoing laser beam directed at a remote object using coherent imaging of the object or its vicinity in the context of relative movement between the imaged object and the laser beam projecting platform or the coherent imaging sensor(s).

BACKGROUND OF THE DISCLOSURE

Coherent imaging methods have value for obtaining image-based data from distant objects. However, object motion on the order of the wavelength of light imparts interference features to the coherent signal. At the same time, atmospheric turbulence and other phenomena introduce wavefront errors in a laser beam directed at a distant object, especially if a focused laser beam is desired on the distant object.

SUMMARY OF THE DISCLOSURE

A laser beam projection system builds on a coherent imaging system to project a tightly focused laser beam onto a remote object. The coherent imaging system produces coherent flood illumination and local oscillator (LO) illumination derived based on a same master oscillator (MO) as the flood illumination. The coherent flood illumination is directed toward a remote object. Simultaneously, a laser beam projection system directs a second (and generally higher power) laser beam onto a desired aimpoint on the same remote object. The second laser beam is often derived from a second master oscillator. A Doppler sensor receives the LO illumination and a return of flood illumination reflected off the object. Doppler shift data from the Doppler sensor, corresponding to a longitudinal velocity of the object relative to the imaging system, is used to produce Doppler-shifted LO illumination received by a focal plane array (FPA), together with the return illumination from the object. Interference between the Doppler-shifted LO illumination and the return illumination facilitates producing an image of the object with the low bandwidth FPA despite the longitudinal velocity. The wavefront error of the image, or a region of the image, is computed and compared to the desired wavefront at the aimpoint. The difference is applied to a deformable mirror to shape the wavefront of the second projected laser beam for obtaining the optimum or desired intensity profile of the second laser beam at the aimpoint on the remote object.

In some embodiments, a high energy laser (HEL) is projected towards a remote object to form a high intensity hitspot, which is imaged on the remote object by the coherent imaging system that also images the remote object. (This imaging of both the object and the hitspot allows the registration of the location of the hitspot on the remote object.) A second local oscillator (LO) illumination is derived based on the second master oscillator. An HEL LO produces HEL LO illumination based on one or both of the second LO or second HEL MO outputs. The focal plane array receives the HEL return of the hitspot reflected off the remote object, together with the HEL LO illumination, such that the light intensity data for at least some pixels of the focal plane array corresponds to interference of the HEL LO illumination with the HEL return. Thus, the coherent image on the FPA is an image of the remote object and the image of the hitspot (interferences of the HEL LO illumination and the HEL return) A deformable mirror receives the HEL source beam and directs it toward the aimpoint on the remote object. The processors employ at least one of the output of the Doppler sensor or the light intensity data from the focal plane array to control one or both of deformation and orientation of the deformable mirror. The deformable mirror is controlled by the processor(s) in response to either a determined wavefront error (WFE), pre-distorting the HEL beam, or an alteration required for the direction of the HEL beam to coincide with an aimspot on the remote object. The deformable mirror is controlled based on wavefront errors calculated using on the coherent image on the FPA.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
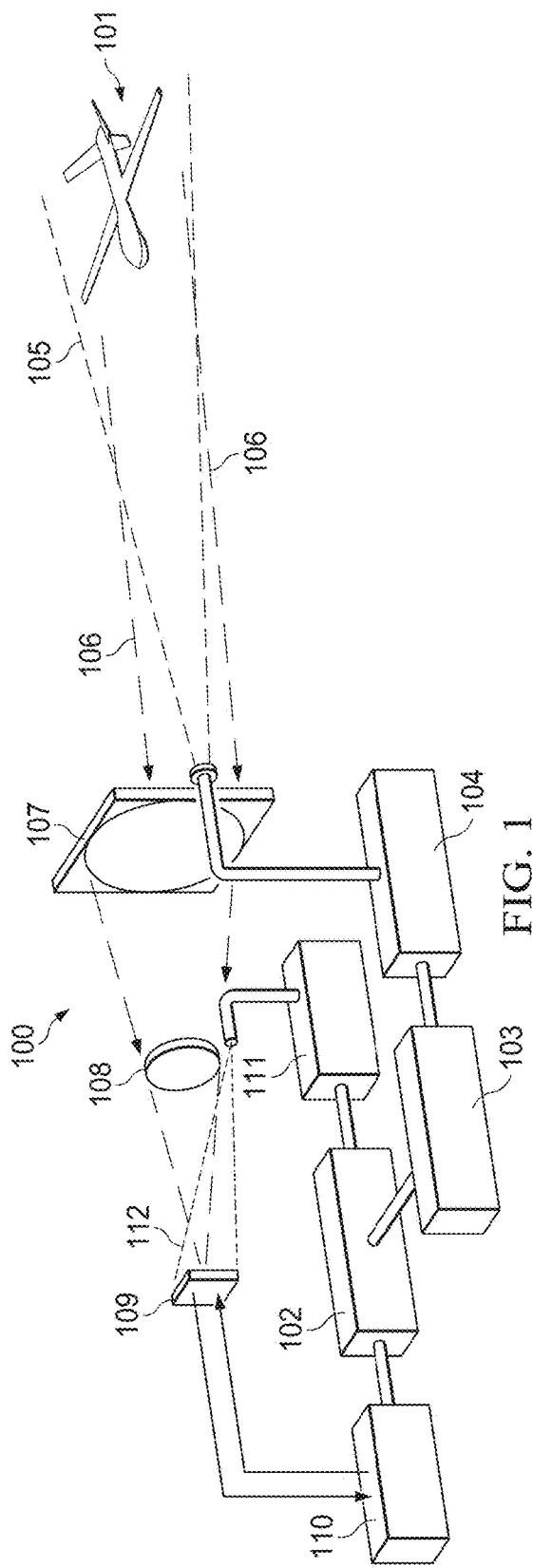
FIG. 1 is a diagram illustrating operation of a coherent imaging system in accordance with one embodiment of the present disclosure.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Coherent imaging systems, where an active laser-based system is employed to measure the amplitude and phase of an image, rely on the interference between a local oscillator (LO) beam and the return from a coherently illuminated target. Coherent imaging provides great value for interrogating distant objects. Specific elements of this value include: improved performance with low light levels, three-dimensional (3D) imaging, correction of optical aberrations, and evaluation of intra-object motion. For example, coherent imaging generally involves photon-limited detection, which allows operation with lower illumination power than direct detection methods. In addition, three dimensional (3D) images may be obtained by combining coherent images at different wavelengths, and optical aberrations (e.g., wavefront errors) may be determined and corrected with coherent imaging.

Coherent signatures, however, are very dynamic and require high-speed data collection sensors to record image data. When the target moves relative to the sensor, the interference frequency (IF, which may be determined for the purposes discussed below based on the absolute value of the return illumination frequency minus the frequency of the frequency-shifted local oscillator) of the return experiences a Doppler shift. For dynamic engagements, this interference frequency can be variable, as the relative motion of the sensor and/or target change. Target motion on the order of the wavelength of light imparts interference features to the coherent signal, and thus prior coherent imaging systems must have very short integration times and high-bandwidths. Thus, while valuable in at least the respects described above, coherent imaging requires very high-speed detectors, because object motion on the order of the wavelength of light imparts essential information to the signal that must be recorded by the detection system. This complicates coherent imaging for engagements in which there is significant relative motion between the sensor platform and the object being interrogated. The present disclosure presents techniques allowing one to record coherent images in dynamic environments with significant relative motion between the sensor and object.

Prior attempts to address the problem resulting from relative motion between sensor and object have included the development of sensors with higher-speed recording capability (e.g., faster frame rates). In addition, some proposals have imparted an offset frequency to the reference beam (local oscillator or "LO") to compensate for longitudinal motion. The present disclosure concerns a coherent imaging system with a separate sensor that adaptively measures the required reference offset frequency and imparts this offset frequency to the reference beam, thereby allowing coherent imaging in dynamic engagements. The present disclosure employs a single or multiple pixel high-speed detector that can record the Doppler offset frequency from the object or a region of the target. The Doppler offset frequency is determined dynamically as the relative velocities of the sensor and object move and the determined Doppler frequency is imparted to the reference beam of the coherent imaging system, thereby allowing coherent imaging with a lower bandwidth, larger-format, imaging sensor. Various embodiments of the design described in the present disclosure include a coherent imaging system with one or more of (a) a high speed Doppler sensor, (b) dynamically imparting the Doppler offset frequency to the reference beam for dynamic engagements, and (c) a Doppler sensor having multiple pixels to improve performance and to evaluate the Doppler offset for different object regions.

FIG. 1 is a diagram illustrating operation of a coherent imaging system in accordance with one embodiment of the present disclosure. Those skilled in the art will recognize that, for simplicity and clarity, some features and components are not explicitly shown, including those illustrated in connection with later figures. For example, the entire optical system—that is, including all mirrors and lenses, beam splitters, transmitter/receivers, apertures, electromechanical shutters, etc., and the associated light paths—is not illustrated in FIG. 1. Such features, including those illustrated in later figures, will be understood to be equally applicable to the coherent imaging system of FIG. 1.

The coherent imaging system 100 excludes the target object 101 depicted in FIG. 1. A master oscillator 102 produces a frequency signal, which passes through modulator 103 and power amplifier 104 to drive an illumination source (a target illumination laser, not explicitly shown) directing coherent flood illumination 105 (illustrated with dashed lines having long dashes) toward the object 101 to be imaged. Light 106 (illustrated with solid lines ending in solid arrowheads) reflected off the object 101 is received through an exit pupil 107 and focused through an imaging pupil 108 onto a short wavelength infrared (SWIR) focal plane array (FPA) 109. SWIR FPA 109 operates under the control of a timing and control processor 110, which is coupled to the master oscillator 102. Also coupled to the master oscillator 102 is a local oscillator (LO) 111, which drives an illumination source (not explicitly shown) directing illumination 112 (illustrated with dashed lines having short dashes) onto the SWIR FPA 109.

In the system of FIG. 1, the target object 101 is flood illuminated with coherent light 105 at a frequency derived from master oscillator 102. The return (reflected) light 106 interferes with the illumination 112 based on the frequency of LO 111, which interference may be determined based on total light detected using FPA 109. This detection method may be referred to as spatial heterodyne or digital holography (DH). Such interference imaging enables photon-noise limited detection, phase processing that also allows 3D imaging, aberration determination/correction, and vibration imaging. However, the interference pattern must be static over the detection integration time—for example, about 100 nanoseconds (nsec) (that is, 0.1 microseconds (μsec)), or some other period within the range 0.001 μsec to 1.0 μsec. In addition, relative motion between the coherent imaging system and the object (especially longitudinal motion toward or away from each other) drives a need for either shorter detection intervals or offsetting the LO frequency in a manner canceling the Doppler frequency offset from the longitudinal object velocity.

Figure 2:
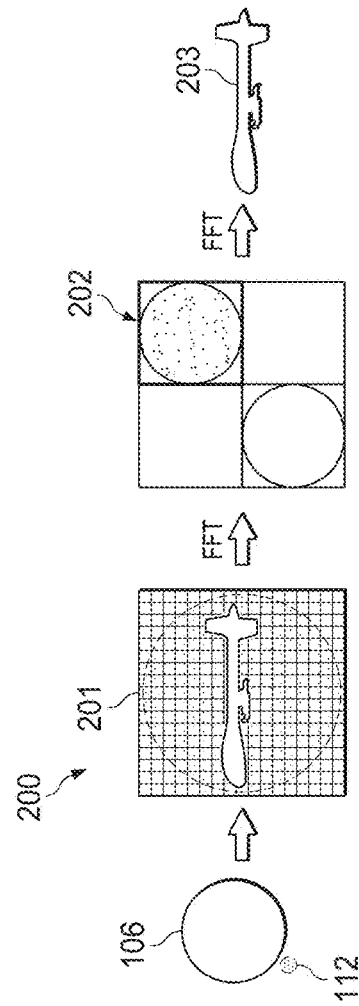
FIG. 2 illustrates image processing performed within the coherent imaging system of FIG. 1.

FIG. 2 illustrates processing performed within the coherent imaging system of FIG. 1. This processing 200 is performed by processing circuitry within, for example, the timing and control processor 110 or optionally by a separate processor coupled to the system 100 (and not shown in FIG. 1). The illumination 106 received through the exit pupil 107 and the illumination 112 based on the LO 111 interfere at the detector array (i.e., the FPA), causing the intensity of light 201 received at the individual pixels of the detector array to vary based upon an image corresponding to flood illumination light reflected off the object. A fast Fourier transform (FFT) of the intensity values from the detector array produces digital image data 202 based on the light received through the exit pupil 107 and the LO-based illumination

112. A further FFT on a portion of the digital image data 202 may produce a digital display 203 of the intensity image, a complex-valued two-dimensional (2D) image for the object.

Figure 3:
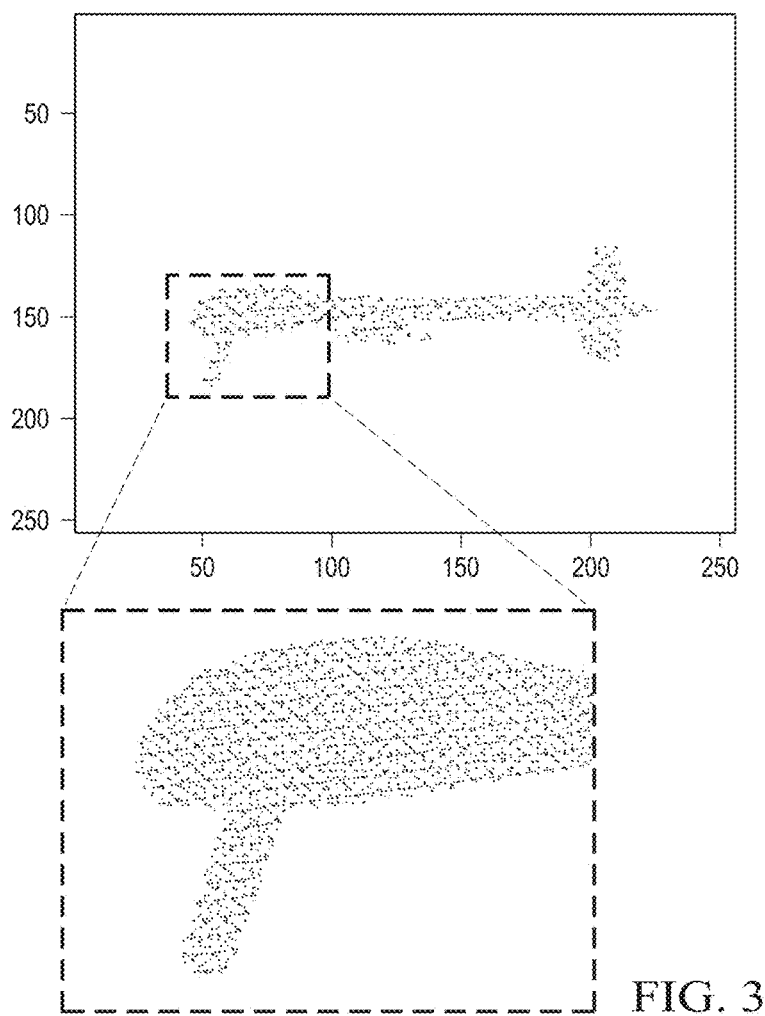
FIG. 3 is a simulated intensity image obtained using a coherent imaging system of the type illustrated in FIG. 1 together with the processing illustrated in FIG. 2.

FIG. 3 is a simulated intensity image obtained using a coherent imaging system of the type illustrated in FIG. 1 together with the processing illustrated in FIG. 2. The simulated intensity image corresponds to light recorded by a 256×256 detector array, illustrating how relative motion between the imaging sensor and the object can degrade the coherent signal and cause the fine fringe detail to "wash out." Note the blurred edges for fine fringe detail imparted by spatially offset LO. In dynamic engagements, longitudinal motion between the target and the imaging system (motion of the target toward or away from the imaging system) has the largest impact on fringe motion. The impact is sometimes referred to as a gross Doppler frequency shift. The effect occurs because integration time $T_{INT}$ (which must be less than the period of the interference frequency, i.e., $T_{INT}$<1/IF) varies inversely with the longitudinal velocity, which in dynamic environments will often vary with time: $T_{INT}$<λ/V where λ is the source wavelength and V is the longitudinal velocity. For large longitudinal velocities V, integration time can fall below the capability of the detector array technology. In some instances, the effect may be reduced by adding an offset frequency on the LO. Coherent imaging systems based on digital holography (DH) use a multi-pixel framing camera that records a "snapshot" of the interference pattern with an integration time $T_{INT}$ of, for example, 1 microsecond (μsec). This requires the interference pattern to be static over $T_{INT}$, which means that the IF must be less than 1 mega-Hertz (MHz). To accomplish DH detection in dynamic engagements thus requires the ability to monitor the target's Doppler shift and adjust the LO so that the IF is <1 MHz.

In the system for coherent imaging during dynamic engagements in accordance with the present disclosure, a high bandwidth coherent detection system is introduced to measure the Doppler shift in the return and thus the longitudinal velocity (i.e., a Doppler sensor). The Doppler offset frequency (proportional to the longitudinal velocity) is measured, and the measured Doppler frequency is applied to the shift in the frequency of the LO beam to make the interference pattern static over the integration time. The capabilities of the high bandwidth detector employed may determine a limit on target range, for acceptable timing of SWIR FPA exposure. The Doppler sensor may consist of a single pixel detector, or alternatively may employ multiple pixels to enhance signal properties and determine Doppler shift for several points on the target. A high bandwidth detector also determines the target range for timing of SWIR focal plane array (FPA) exposure.

The coherent imaging system of the present disclosure employs a high-bandwidth detector (separate from the DH camera employed to measure interference) to measure the target's Doppler frequency. The Doppler frequency is then applied to the LO, so that the interference pattern is static over the camera's integration time. This process of Doppler measurement and IF adjustment is performed repetitively over the dynamic engagement, to enable DH based coherent imaging. The dedicated sensor for measuring Doppler shifts and resulting variation of the LO frequency provides an effective closed loop system in which changes in longitudinal velocity are compensated for in real time. This extends the utility of the coherent imaging system to highly dynamic environments.

Figure 4:
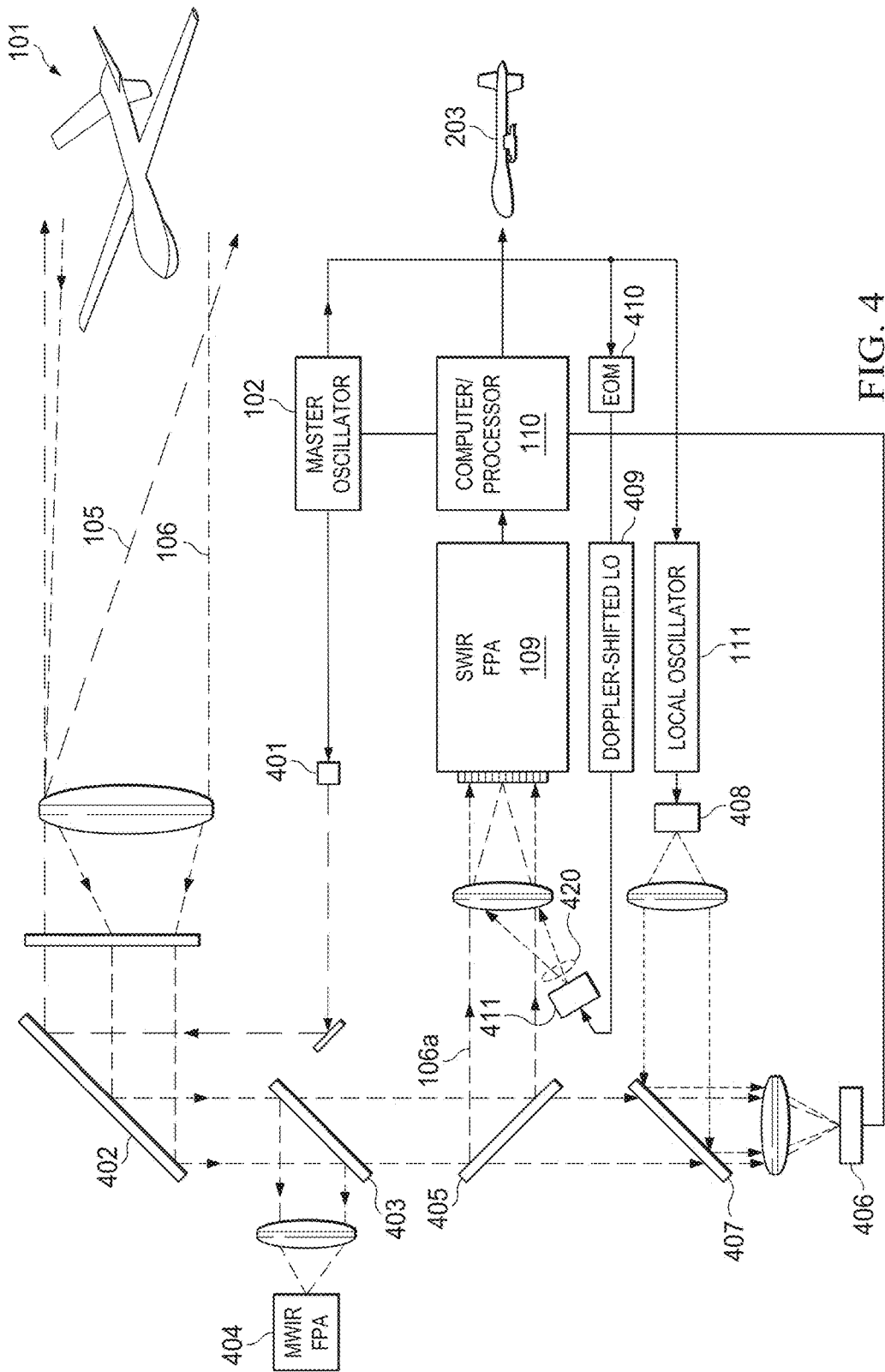
FIG. 4 is a diagrammatic illustration of additional details for the coherent imaging system of FIG. 1 in accordance with embodiments of the present disclosure.

FIG. 4 is a diagrammatic illustration of additional details for the coherent imaging system of FIG. 1, in accordance with embodiments of the present disclosure. For simplicity and clarity, some components of FIG. 1 and/or later figures are not shown, while additional components not illustrated in FIG. 1 are shown. It will be understood that all features illustrated in the figures may be employed in any of the embodiments described. Omission of a feature or component from a particular figure is for purposes of simplicity and clarity, and not meant to imply that the feature or component cannot be employed in the embodiments described in connection with that figures.

As previously described, coherent light 105 from flood illumination source 401 driven by master oscillator 102 reflects off object 101 and is received as reflected (or "return") illumination 106. In the embodiment shown, the coherent light from flood illumination source 401 reflects off a fixed mirror and then a (preferably deformable) mirror 402 before passing through suitable optical components for direction toward the object 101. A first beam splitter 403 splits the received return illumination 106, directing a portion to be focused on mid-wave infrared (MWIR) FPA 404. A second beam splitter 405 splits the portion of the return illumination 106 passing through the first beam splitter 403 between being focused on SWIR FPA 109 and being focused on a Doppler sensor 406. A transmitter/receiver 407, which may be polarized to pass through the part of the return illumination 106 not redirected by beam splitter 405, effectively superimposes the non-redirected portion of the return illumination 106 and illumination based on the LO frequency, from illumination source 408, on Doppler sensor 406. The Doppler sensor 406 has a single pixel (or multiple pixels) that measure Doppler frequency of the return illumination relative to the LO illumination from illumination source 408. The sampling rate for the Doppler sensor 406 should be greater than the greatest (longitudinal) velocity for the target divided by the wavelength used for the flood illumination (or other illumination source(s) described below). The output of Doppler sensor 406 is received by a processor 110, which determines a Doppler shift (or offset) of the return illumination relative to the flood illumination. That Doppler shift is representative of the longitudinal velocity (or, stated differently, the longitudinal component of the total velocity) of the object 101 relative to the coherent imaging system 100.

The Doppler shift is measured and updated on a regular basis to account for longitudinal acceleration by object 101. The Doppler shift is employed by a Doppler-shifted local oscillator 409, which generates a Doppler-shifted version of the output frequency from the local oscillator 111 used to produce the Doppler-shifted LO illumination. A value based on a measurement (e.g., an inverse) of the Doppler shift may be applied to the frequency signal from the master oscillator 102 by an electro-optic modulator (EOM) 410. The output of EOM 410 is received by Doppler-shifted local oscillator 409, which produces a Doppler shifted LO illumination signal that drives an illumination source 411 to produce the Doppler shifted LO illumination 420. The image sensor SWIR FPA 109 is provided with the Doppler-shifted LO illumination 420 derived from Doppler shifted LO output signal, superimposed with a portion of the return illumination 106 from beam splitter 405, to offset Doppler effects on the imaging. As a result, the interference pattern can be recorded with a low bandwidth focal plane array—for example, an FPA operating with a 0.1 to 1 microsecond (μsec) global shutter.

As described above, the flood illumination from light source 401 and the LO illumination from light source 408 both derive from same stable master oscillator 102. Likewise, the Doppler-shifted local oscillator 409 derives from that same, stable master oscillator 102. For a pulsed system, the Doppler sensor 406 also measures the target range, so that the SWIR FPA 109 may be triggered when the return pulse from the object 101 is present.

The coherent imaging system 400 of the present disclosure also finds use in assessing a projected laser spot on a distant object. Determining the effectiveness of a focused high energy laser (HEL) hitspot on a remote target may be performed by indirect methods. In those applications, atmospheric aberrations may be sensed from the return of a separate beam, usually of a different wavelength, and correction imparted on the HEL beam. The HEL hitspot on target is usually not observable, since such (direct) observation requires superb boresight alignment, and line-of-sight (LOS) is typically the metric employed to determine a projected HEL hitspot location. Instead, the HEL hitspot on target is usually sensed using the MWIR FPA 404, which measures the HEL hitspot indirectly by sensing the thermal radiation emitted from the hitspot. Furthermore, thermal sensing of the HEL hitspot is subject to latency, since the thermal effects are not instantaneous and the MWIR sensor 404 has lower imaging resolution than can be obtained at the native wavelength of the HEL source (typically near 1 micron). Passive imaging of the HEL hitspot at the native HEL wavelength for direct observation would therefore typically require an additional SWIR sensor. Because of those difficulties, target kill assessment is more commonly determined by a dramatic drop in signal-to-noise ratio (SNR).

As discussed above, coherent imaging methods have great value for obtaining image-based information from distant objects, including lower illumination power and determination of and correction for optical aberrations (wavefront errors). In addition, wavelength selectivity allows for simultaneous imaging of multiple bands. Accordingly, digital holography may be employed to simultaneously image and observe an HEL beam spot on a distant non-cooperative target.

Several configurations have been proposed to enhance target tracking using hit spot detection and assessment of hit spot effectiveness. Some require two detectors: one for the HEL hitspot detection and one for illumination return processing. The use of two detectors increases complexity and size, weight and power (SWaP) and requires filtering or active beam control to guide HEL return to the imaging detector. Direct HEL hitspot detection methods are limited by detector noise (i.e., SNR limited). Registration issues inherent in using two separate detectors include strenuous boresight alignment and mechanical rigidity requirements, which increases system complexity, and will have an offset even when algorithms are used to compensate for registration, due to computational imprecisions. Target sizes are limited for previously proposed configurations since subpixel imaging poses challenges for direct detect systems (that is, across subpixel target features, the HEL will be much smaller and harder to image). Wavefront error (WFE) measurements are performed by a separate detector (e.g., using Shack-Hartman, shearing interferometer, etc.), requiring the additional detector and processing. WFE measurements are indirect (e.g., based on WF gradient) and limited (in branch cuts, etc.) by effects that result from having a speckled return.

Directed energy weapons require adaptive optics to correct for wavefront aberrations imparted by the atmosphere during a mission scenario. However, once the wavefront is sensed and subsequently corrected for, direct assessment of the effectiveness of the correction at the target is difficult. Furthermore, kill assessment is often made by indirect means, e.g., target heating, which can lead to incorrectly identifying the target as neutralized. In the present disclosure, a real-time, high resolution hit spot detector monitors a laser beam spot projected onto a distant, non-cooperative target, and can also be used as a more direct means of damage assessment of a neutralized target. Digital holographic imaging is employed to simultaneously image both a distant target and a laser beam projected onto the distant target.

The present disclosure enables assessment of a projected laser spot (e.g., an HEL hitspot) on a distant object, including simultaneous coherent imaging of both a focused HEL hitspot and the non-cooperative target at large distances. Spatially and angularly offset local oscillators interfere with the HEL and illumination return from the target. A coherent Doppler detector senses the Doppler shift frequency directly, and sends the signal to modulators which shift the frequency of the local oscillators to maintain coherence over the engagement timeline. The HEL hitspot on a distant target is therefore monitored directly, kill assessment is more easily determined, and the HEL can be "walked" onto an aim point. Use of a single detector minimizes SWaP, with acceptance of a single polarization return enabling a single transmitter/receiver (Tx/Rx) architecture. HEL WFE may be sensed directly by examining the sharpness of the HEL hitspot on the target and/or by sharpness maximization. Because of its limited extent the WFE can be determined with decreased processing and latency. The imaged HEL hitspot serves as a glint, which can be used to increase the system LOS accuracy.

Figure 5:
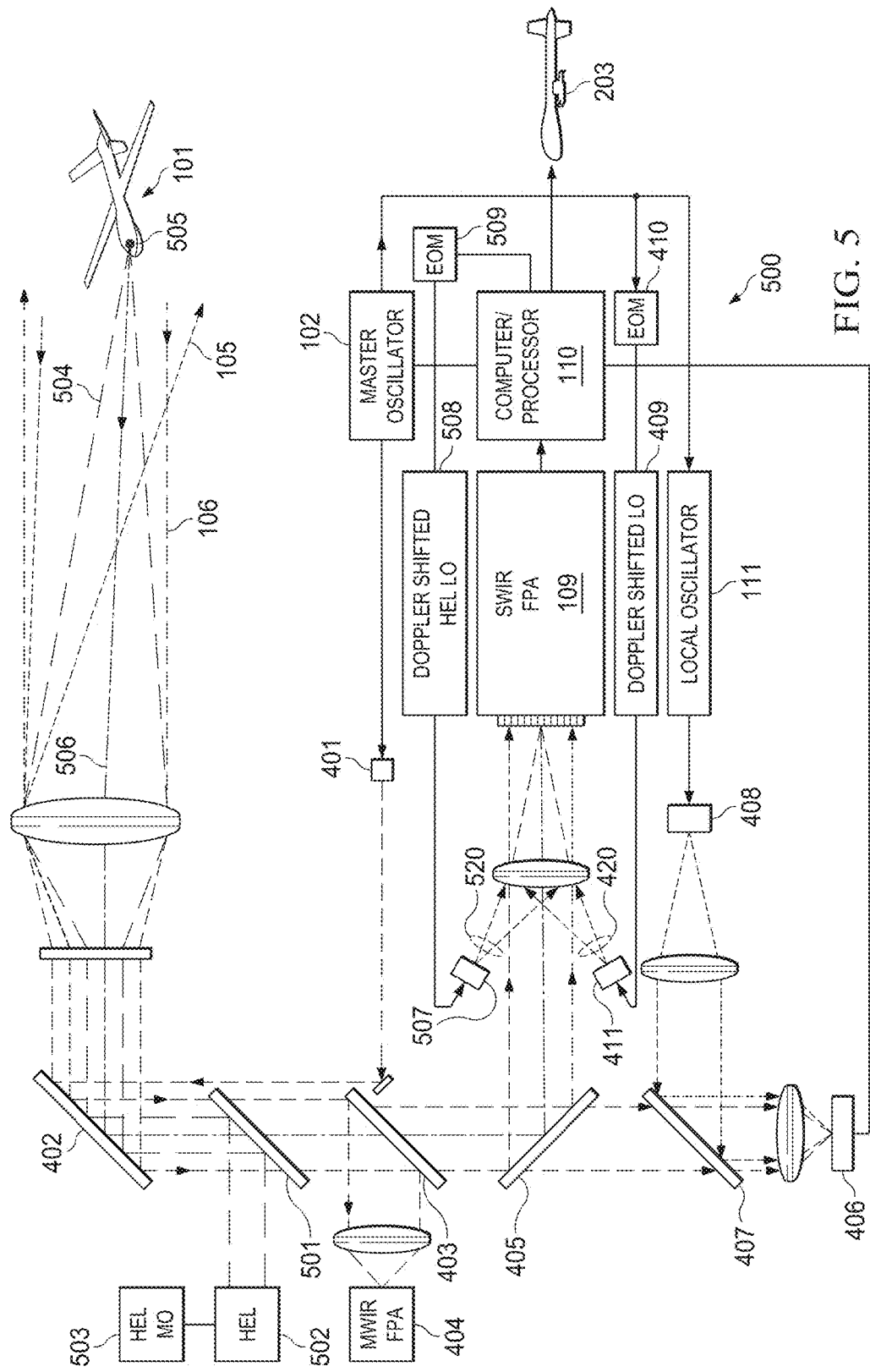
FIG. 5 is a diagrammatic illustration of additional details for the coherent imaging system of FIG. 1 in accordance with alternate embodiments of the present disclosure including a projected laser spot.

FIG. 5 is a diagrammatic illustration of additional details for the coherent imaging system of FIG. 1 in accordance with alternate embodiments of the present disclosure including a projected laser spot. The coherent imaging system 500 is similar to the embodiments of FIGS. 1 and 4, although some features (e.g., details of the optics system) that were not illustrated in FIGS. 1 and 4 are explicitly shown in FIG. 5. It will be understood that the same features may also be present in the embodiments of FIGS. 1 and 4. In addition, the complete light paths of outgoing and return light are not shown.

Coherent imaging system 500 includes a first transmitter/receiver 501 within the path of the return illumination 106. The first transmitter/receiver 501 may have a polarization that differs from the polarization of the transmitter/receiver 407, and may depend on the nature of the output illumination from the HEL 502. The HEL 502 produces high energy laser illumination 504 for projecting an HEL hitspot 505 on the target 101. As discussed further below, HEL 502 may operate based on a signal from an HEL master oscillator 503 separate from master oscillator 102. The first transmitter/receiver 501 redirects the HEL beam 504 to the mirror 402, which in turn redirects the HEL beam 504 toward the target 101 to form an HEL hitspot 505 on the object 101. The reflected HEL beam return 506 reflected off target 101 follows a similar path as the return 106 of the flood illumination 105 via mirror 402, through the first transmitter/receiver 501, and redirected by beam splitter 405 to impinge upon SWIR FPA 109. HEL LO-modulated illumination 520 from illumination source 507, based on an output of Doppler-shifted HEL LO 508, is superimposed on the SWIR FPA 109 with the HEL beam return 506. The Doppler-shifted HEL LO 508 may receive a signal from EOM 509 based on an output of Doppler sensor 406, and produce an output based on HEL MO 503. With such a configuration, the HEL LO illumination 520 from illumination source 507 is spatially, angularly, and spectrally offset from the LO illumination 420 from illumination source 411. The HEL LO illumination 520 is emitted onto the SWIR FPA 109, together with the return 106 of the flood illumination 105, the HEL return 506 of the HEL beam 504, and the LO illumination 420. The gating or global shutter speed of gating of the SWIR FPA 109 may be set based upon the pulse timing for the flood illumination return 106. Because the HEL beam 504 is typically continuous wave (CW) rather than pulsed, the system described offers flexibility in modifying the detector integration time for the HEL imaging. In addition, there may be orders of magnitude difference in the power levels of the HEL return 506 and the flood illumination return 106. To prevent saturation of the SWIR FPA 109 by the HEL return 506, various techniques including spectral and polarization attenuation may be employed, or the detector integration time may be adaptively decreased when the HEL return 506 is present. The combined illumination received at the SWIR FPA 109 is processed by processor 110 to indicate the image of the target 101 as well as the projected laser spot (if reflected off target 101)

The processor 110 determines WFE using an auto-focus algorithm, and the inverse of the WFE may be applied to mirror 402 under the control of the processor 110 to pre-distort the beam of the HEL beam 504 and focus the HEL hitspot 505 onto target 101. In addition, the orientation of mirror 402 may also be altered under the control of the processor 110, together with or separately from alteration of the deformation, to change a direction in 3D space of the HEL beam 504. In that manner, the target spot 505 produced by the HEL beam 504 may be "walked" onto a desired aimpoint on the target 101.

Figure 6:
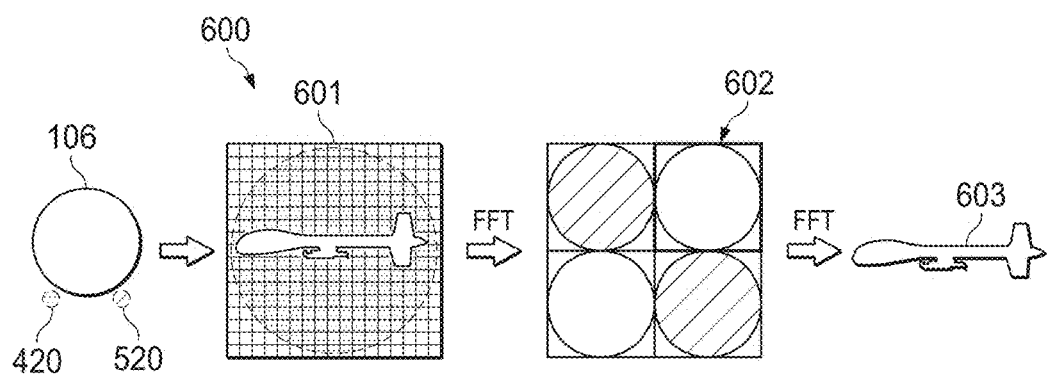
FIG. 6 illustrates image processing performed within the coherent imaging system of FIG. 5.

FIG. 6 illustrates image processing performed within the coherent imaging system of FIG. 5. The processing 600 is analogous to that described in connection with FIG. 2, except that the received return and LO illumination at FPA 109 also includes the LO modulated illumination 520 derived from the Doppler shifted HEL LO illumination source 507. As with the processing 200 of FIG. 2, the processing 600 includes FFT based signal processing of the intensity of light 601 received at the individual pixels of the detector array to produce digital image data 602 and a digital, complex-valued image 603. As illustrated, a different portion of the digital data 602 produced by the initial FFT than is used for the target image may be selected for further processing to produce the laser spot within the digital, complex-valued image 603. Because the HEL LO illumination 520 from source 507 and the flood illumination LO illumination 420 from light source 411 are spatially, angularly, and spectrally offset, the processing of both images may be carried out simultaneously, with the resultant image composed of the HEL hitspot image overlaid with the target image. The projected laser beam (e.g., HEL beam) return and active target flood illumination return simultaneously interfere with the respective local oscillator versions of that illumination at the FPA 109. Highly registered images are therefore overlaid, with the resultant image containing the projected laser beam spot as it appears on the target 101. Moreover, because digital holography offers photon limited performance, digital holographic techniques may be used to directly sense the WFE imparted on the projected laser beam.

In the various embodiments described, modifications can be made to improve performance. For example, to avoid negative effects resulting from beam break-up of either or both of the flood illumination or the HEL beam, multiple flood illumination beams and/or multiple HEL beams may be employed. While a single Doppler detector is described above as sensing both flood illumination return and HEL beam return, separate Doppler detectors could be employed instead.

As implied above, atmospherically induced (wavefront) phase errors limit the ability to project a focused laser beam onto a distant target. Coherent imaging methods allow determination of this wavefront error (WFE) through the use of auto-focus algorithms. A laser beam can then be pre-compensated for the WFE using a deformable mirror to produce a tightly focused laser spot on the target. In order to allow coherent imaging and pre-compensation of the outgoing laser beam in conditions where the target is moving, a high-speed Doppler sensor that measures the relative velocity between the sensor and target is employed. The LO for the coherent imaging system is adjusted to compensate for the target motion, and thus enables coherent imaging and WFE determination.

Figure 7A:
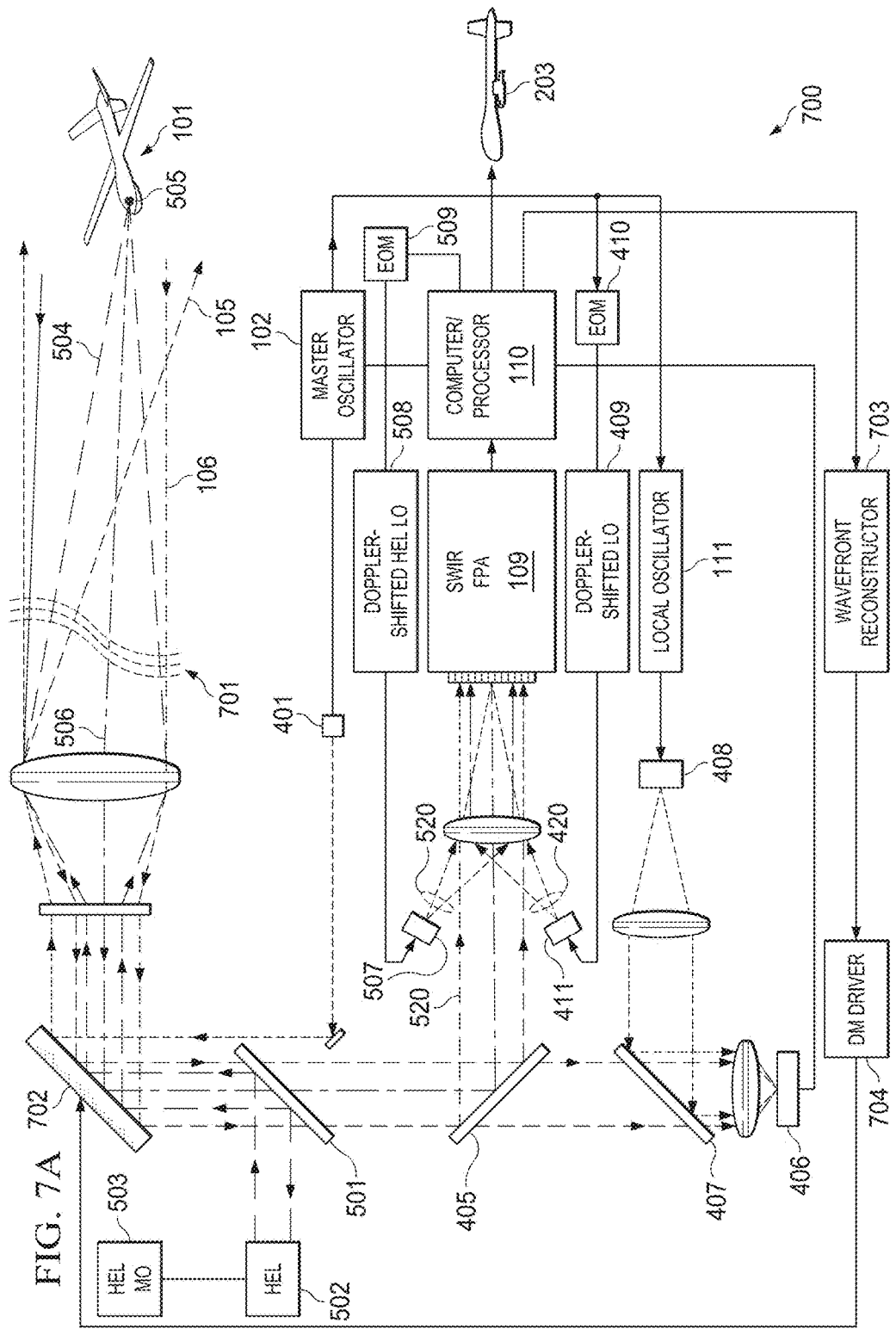
FIGS. 7A through 7B are diagrammatic illustrations of first and second alternate embodiments of the present laser beam projection system disclosure including wavefront error correction for a projected laser spot.

FIG. 7A is a diagrammatic illustration of a first alternate embodiment of the present laser beam projection system disclosure, including wavefront error correction for a projected laser hitspot. For laser beam projection system 700, various physical phenomena such as atmospheric turbulence 701 between the optics of the laser beam projection system 700 and the target 101 distorts or deflects (not shown in the figures) the HEL beam 504 producing the HEL hitspot 505. In this embodiment, a deformable mirror 702 is employed to direct and shape the HEL beam 504. A wavefront reconstructor 703 (which may actually form a part of the computer/processor 110) is employed to adjust a deformable mirror driver 704, which controls the surface orientation and shape of the deformable mirror 702.

In this embodiment, the target illumination source 401 produces flood illumination 105 directed onto the target 101. The flood illumination return 106 undergoes wavefront distortions (e.g., due to atmospheric conditions, airflow, optics aberrations, or some combination of any two or more of those). The WFE resulting from these distortions is measured by processing the FPA 109 output as previously described. Meanwhile, also as previously described, relative motion between the laser beam projection system 700 and the target 101 is detected based upon the output of the high-speed Doppler sensor 406. An inverse of the Doppler offset is applied to EOM 410 to produce illumination 420 driven by Doppler shifted LO 409. The FPA 109 records interference of flood illumination return 106 and Doppler shifted LO illumination 420. The computer/processor 110 determines WFE using an auto-focus algorithm, and an inverse WFE calculated by the wavefront reconstructor 703 is applied to deformable mirror 702 to pre-distort the outgoing HEL beam 504 to compensate for the measured wavefront distortions. In this manner, the HEL hitspot 505 is focused onto the target 101.

Optionally, the HEL hitspot 505 can also be imaged onto the FPA 109. This imaging of both the target 101 and the hitspot 505 allows the registration of the location of the hitspot 505 on the target 101. An HEL local oscillator (LO) may be derived based on the HEL MO 503. An HEL LO produces HEL LO illumination based on one or both of the HEL LO or HEL MO 503 outputs. An inverse of the Doppler offset is applied to EOM 509 to produce illumination 520 driven by Doppler shifted HEL LO 508. The FPA 109 receives the HEL return 506 of the hitspot 505 reflected off the target, together with the Doppler shifted HEL LO illumination 520, such that the light intensity information for at least some pixels of the FPA 109 corresponds to interference of the HEL LO illumination 520 with the HEL return 506. Thus, the coherent image on the FPA 109 is an image of both the target 101 and the hitspot 505.

Figure 7B:
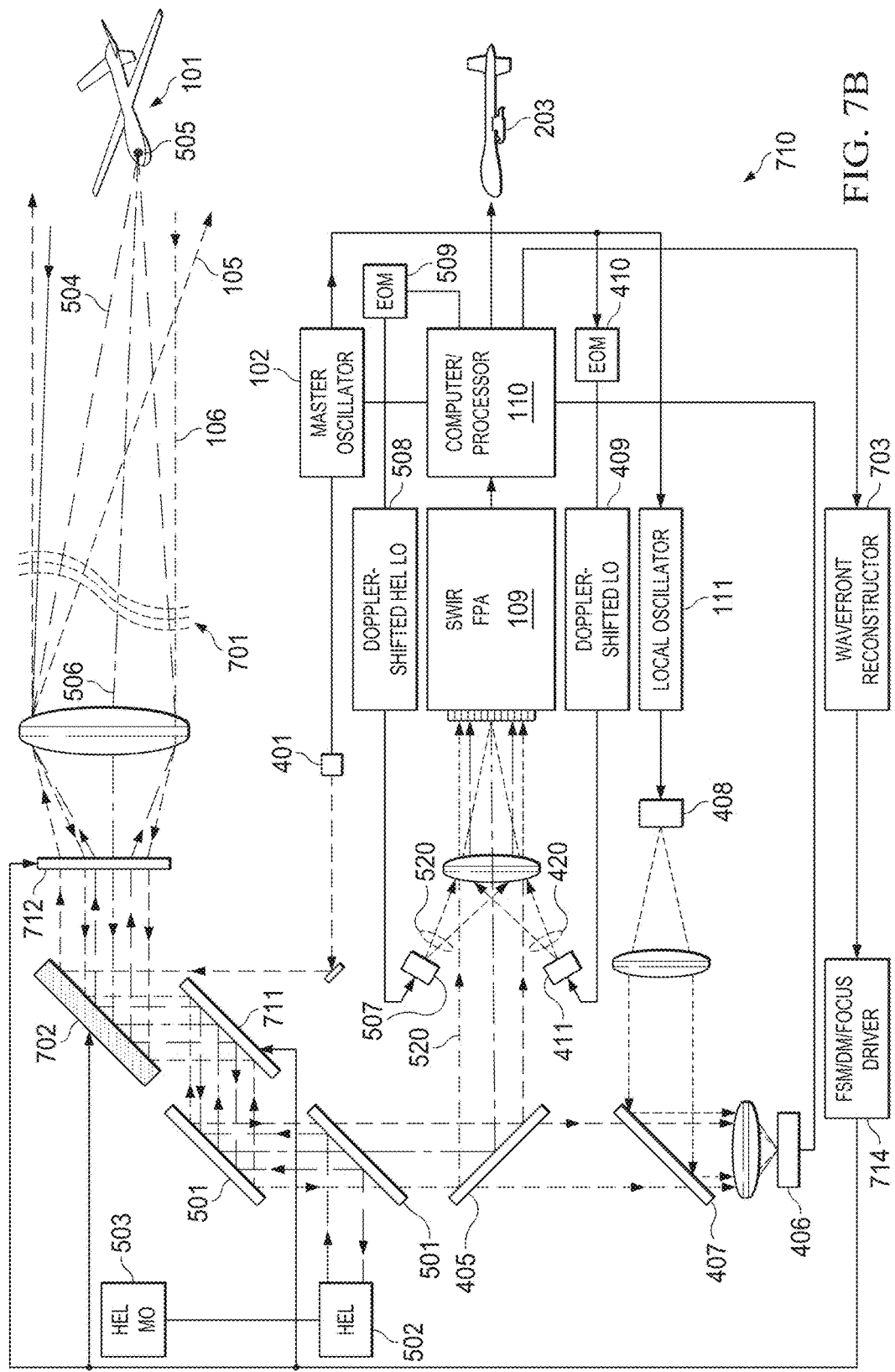

FIG. 7B is a diagrammatic illustration of a second alternate embodiment of the present laser beam projection system disclosure, including wavefront error correction for a projected laser hitspot, in which wavefront correction is apportioned. While the embodiment of FIG. 7A showed all wavefront error correction being provided by the deformable mirror 702, alternatively the wavefront correction may be assigned to multiple optical components. That is, different optical elements may be used for different types or components of the wavefront error: tip/tilt error or error component; focus error or error component; and higher order error or error component. In the alternative embodiment 710 of FIG. 7B, for example, one or more fast steering mirrors (FSMs) 711 could correct for tilt errors, while focus errors are corrected by a focusing mechanism 712 and remaining higher order errors are corrected by a deformable mirror 702. A driver 714 coupled to the wavefront reconstructor 703 (or processor 110) generates control signals for each of the FSM(s) 711, DM 702 and focus mechanism 712 based on the wavefront error.

As described, the wavefront error (WFE) calculated to obtain the image of the remote object can be used both to obtain a sharper image of the remote object and to manipulate the wavefront of a second projected laser beam (separate from the flood illuminating laser) by altering its phase profile, for example by manipulating the wavefront of the HEL beam 504 in FIGS. 7A and 7B. This is desirable in many cases, for example, when attempting to tightly focus the second projected laser beam (HEL beam 504 in FIGS. 7A and 7B) to form a high intensity hitspot (505 in FIGS. 7A and 7B) on the remote object (target 101 in FIGS. 7A and 7B) so that a desired effect (e.g., melting, mechanical destruction, ignition, etc.) can be achieved at the remote object (target 101 in FIGS. 7A and 7B). The wavefront of the second projected laser beam (HEL beam 504 in FIGS. 7A and 7B) can be altered by a deformable mirror (702 in FIGS. 7A and 7B) whose surface can be controllably warped. The wavefront can also be manipulated using other optical elements, such as focus mechanisms and fast steering mirrors (FSMs). All types of wavefront changes (not just those leading to a focused hit spot) may be provided, as allowed for by the deformable mirror (702 in FIGS. 7A and 7B), focus mechanism (712 in FIG. 7B), and FSM(s) (711 in FIG. 7B). The wavefront manipulation process in the context of coherent imaging is used to obtain a focused image of the remote object. In the context of laser beam projection, the wavefront manipulation process often aims to make a tight hitspot on the remote object, and may, for instance, apply the inverse of the same wavefront error detected in coherent imaging, or may be based on calculation of a different wavefront error to be applied to the outgoing laser beam.

Figure 8:
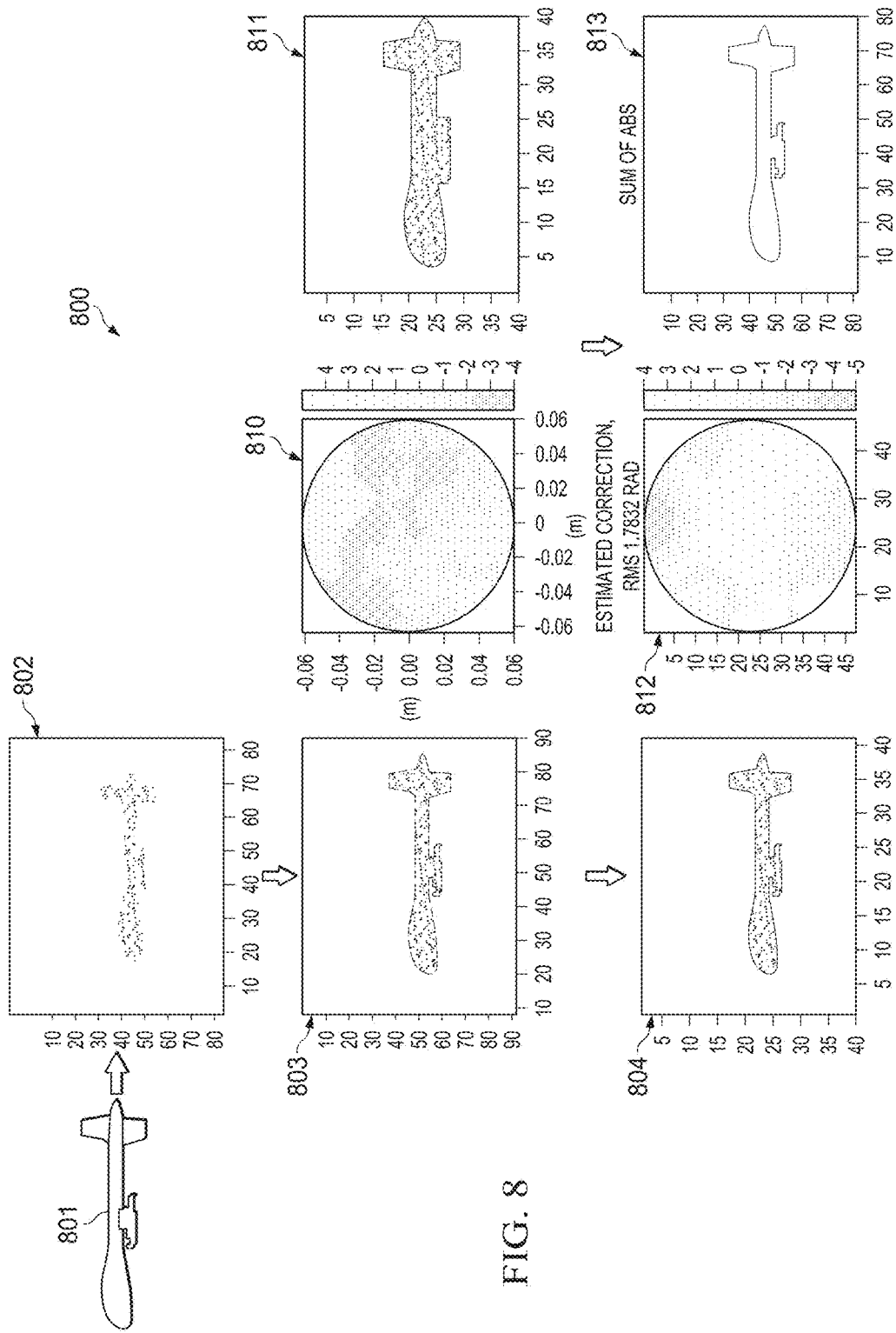
FIG. 8 illustrates aberration determination for wavefront error correction for a projected laser spot in accordance with embodiments of the present disclosure.

FIG. 8 illustrates aberration determination for WFE correction for a projected laser spot using image sharpness in accordance with embodiments of the present disclosure. In the example 800 depicted, simulated images 801, 802, 803 and 804 on the left respectively represent the remote object, a single FPA frame, a single frame of the intensity for interference between the return flood illumination and the LO illumination, and an aggregate intensity over 32 frames for interference between the return flood illumination and the LO illumination. None of the simulated images 802, 803, or 804 have been subjected to wavefront errors. Simulated image 811 shows how wavefront errors distort the resulting images. In particular, simulated image 811 represents an image obtained using 32 frames of interference intensity that has been subject to wavefront errors represented by the wavefront phase profile 810. Simulated image 811 is processed by a sharpness algorithm, such as computation of a wavefront phase error that maximizes sharpness, to derive a corrected image 813. This type of processing improves Strehl ratio. For example, the aberrated images may exhibit a Stehl ratio of 0.27, which after wavefront phase error correction becomes 0.80. Wavefront phase profile 812 represents the estimated wavefront phase correction. Assuming a circular laser beam projection aperture diameter (d) of 0.125 meters (m) at a range of 30 kilometers (km), a flood illumination wavelength of 1.5 microns (μm), and Fried parameter $r_0$ of 0.01 m, at a sampling parameter Q of 2.0, angular resolution of 0.6 m, estimating phase using 50 Zernikes ($d/r_0$=12.5) and 32 speckle realizations, a root mean square (RMS) WFE of 1.72 radians is determined. The estimated wavefront phase correction is then applied to the second projected beam (HEL beam 504 in FIGS. 7A and 7B) to form a high intensity hitspot (505 in FIGS. 7A and 7B) on the remote object (target 101 in FIGS. 7A and 7B). The wavefront of the second projected laser beam (i.e., the HEL beam 504 in FIGS. 7A and 7B) can thus be altered by applying the wavefront phase correction depicted by the wavefront phase profile 812 to the deformable mirror (702 in FIGS. 7A and 7B). Some scaling and geometric modifications of the estimated wavefront phase correction may be required to accommodate differences in the wavelength of the flood illumination (i.e., flood illumination 105 in FIGS. 7A and 7B) and the second projected beam (i.e., the HEL beam 504 in FIGS. 7A and 7B) and the geometry of the deformable mirror 702 with respect to the second projected beam (i.e., the HEL beam 504 in FIGS. 7A and 7B).

Figure 9A:
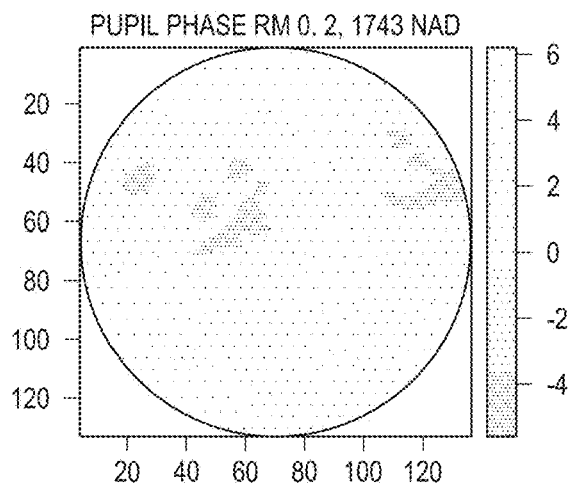
FIGS. 9A through 9C also illustrate wavefront error correction for a projected laser spot in accordance with embodiments of the present disclosure.
Figure 9B:
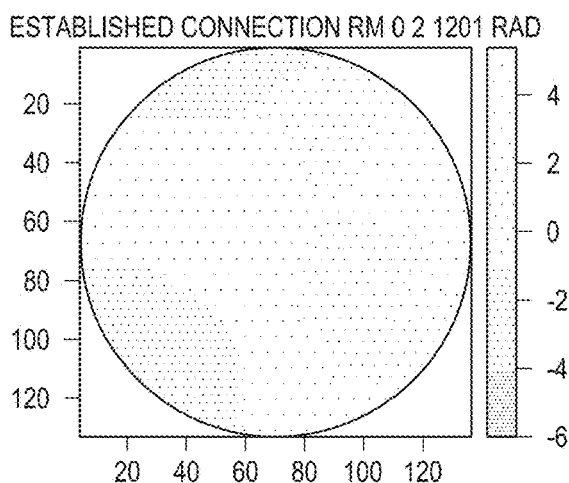
Figure 9C:
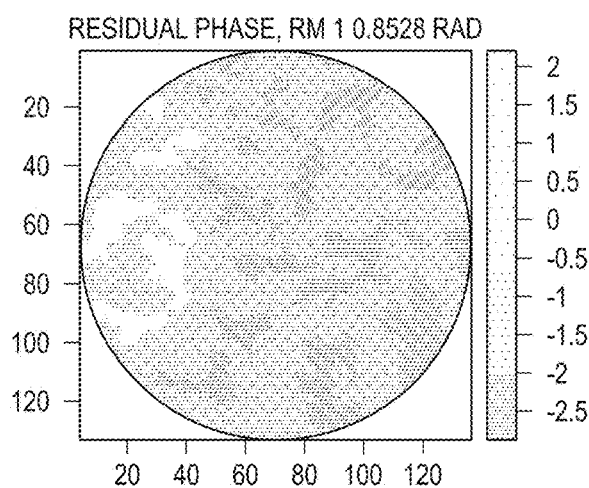

FIGS. 9A through 9C also illustrate WFE correction for a projected laser hitspot using image sharpness in accordance with embodiments of the present disclosure. Image sharpness of the remote object images was corrected from a Strehl ratio of 0.03 to 0.66. The simulated WFE applied is represented by the wavefront phase profile in FIG. 9A which was 2.17 radian (RMS). At a range of 25 km, with an aperture diameter of 0.3 m, a flood illumination wavelength of 1.5 μm, and Fried parameter $r_0$ of 0.03 m, at a sampling parameter Q of 2.0, angular resolution of 0.12 m, estimating phase using 64 Zernike parameters with 16 speckle realizations and a sharpness exponent of 1.2 with a gradient based optimizer, an RMS WFE of 2.17 radians was determined. The WFE solution applied to the deformable mirror shown in the wavefront phase profile in FIG. 9B was 2.12 radian (RMS). The residual WFE after correction, shown in the wavefront phase profile in FIG. 9C, was 0.65 rad (RMS).

Figure 10:
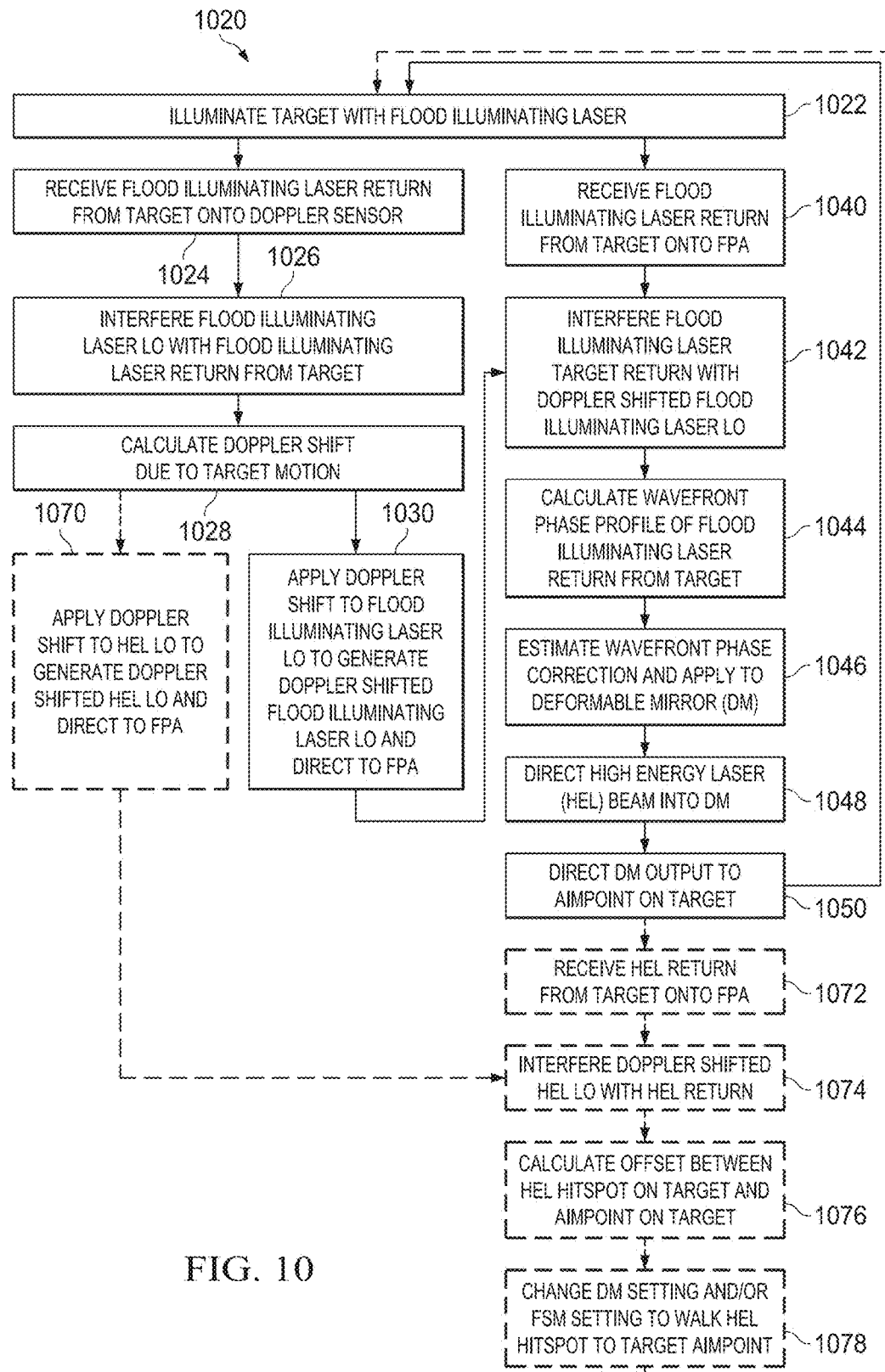
FIG. 10 illustrates a flow chart diagram of the wavefront error correction process for a projected laser hitspot on a remote object.

Putting it all together, FIG. 10 is a diagrammatic illustration of the procedure 1000 for wavefront error correction for a projected laser hitspot on a remote target using either the first or the second alternate embodiment (or a combination of the two) of the laser beam projection system. An optional procedure (shown in dashed process boxes and connecting lines) for imaging the hitspot on target and walking it to a desired aimpoint is also included. The process starts with illumination of the target using the flood illuminating laser in step 1022. The flood illuminating laser scatters back from the target and is received in part onto a Doppler sensor in step 1024 and in part onto a focal plane array (FPA) in step 1040. Simultaneously a local oscillator (LO) illumination derived from the same master oscillator (MO) as the flood illuminating laser is directed at the Doppler sensor. The part of the flood illuminating laser return received onto the Doppler sensor interferes with LO illumination in step 1026.

The interference pattern is sampled and a Doppler shift is calculated in step 1028. The Doppler shift is applied to the LO to generate a Doppler shifted LO and directed onto the FPA in step 1030. The part of the flood illuminating laser return from the target received onto the FPA interferes with the Doppler shifted LO illumination in step 1042. The interference pattern is sampled and a wavefront phase profile of the laser return is calculated in step 1044. This wavefront phase profile is used to estimate a wavefront phase correction which is then is applied to the deformable mirror that directs a second projected beam (e.g., a high energy laser beam—HEL beam) in step 1046. The wavefront phase correction is usually estimated by inverting the wavefront phase profile. Some scaling and geometric modifications of the estimated wavefront phase correction may be required to accommodate differences in the wavelength of the flood illuminating laser and the second projected beam (e.g., the HEL beam) and the geometry of the deformable mirror with respect to the second projected beam (e.g., the HEL beam). The second projected beam is directed at the deformable mirror in step 1048 which in turn directs it at a desired aimpoint on the target in step 1050. At this point the process can repeat, or, optionally the hitspot of the second projected beam can be imaged onto the same FPA with the purpose of directing the hitspot to coincide with the desired aimpoint. The optional process begins with receiving the target return from the second projected beam (e.g., HEL) in step 1072. Simultaneously an HEL LO illumination derived from the same master oscillator (MO) as the laser source of the second projected beam is Doppler shifted and directed at the FPA in step 1070. The Doppler shifted HEL LO and the target return from the second beam (e.g., HEL return) interfere in step 1074. The Doppler shifted HEL LO illumination and the flood illuminating laser LO illumination are spatially, angularly, and spectrally offset, and therefore the processing of both images may be carried out simultaneously, with the resultant image composed of the HEL hitspot image overlaid with the target image. In step 1076, the offset between the hitspot and the desired aimpoint is calculated by processing the hitspot overlaid target image. The offset is used to change the overall tilt of the deformable mirror or the setting of one or more fast steering mirrors (FSMs) to "walk" the hitspot on the desired aimpoint in step 1078.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The description in the present application should not be read as implying that any particular element, step, or function is an essential or critical element which must be included in the claim scope: the scope of patented subject matter is defined only by the allowed claims. Moreover, none of these claims are intended to invoke 35 USC § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

What is claimed is:

1. A laser beam projection system, comprising:
   a flood illumination source configured to produce coherent flood illumination that is directed toward a remote object, the coherent flood illumination derived from an output of a master oscillator (MO);
   a local oscillator (LO) illumination source configured to produce LO illumination derived from an output of an LO, the LO output derived from the MO output;
   a Doppler sensor configured to receive the LO illumination and a first portion of return illumination that comprises the coherent flood illumination reflected off the remote object;
   at least one processor configured to generate, based on an output of the Doppler sensor, Doppler shift data for a Doppler shift corresponding to a longitudinal velocity of the remote object relative to the laser beam projection system;
   a Doppler-shifted LO illumination source configured to produce Doppler-shifted LO illumination derived from the LO output and the Doppler shift data;
   a high energy laser (HEL) source configured to produce an HEL beam derived from an output of an HEL MO;
   a deformable mirror configured to direct the HEL beam from the HEL source toward the remote object; and
   a focal plane array configured to receive a second portion of the return illumination and the Doppler-shifted LO illumination,
   wherein the at least one processor is further configured to:
      receive light intensity data from the focal plane array,
      generate, based on the light intensity data, an image of the remote object,
      determine a wavefront phase profile of the return illumination based on the image of the remote object,
      calculate a wavefront error based on a comparison between the determined wavefront phase profile and a desired wavefront phase profile of the HEL beam on the remote object, and
      control the deformable mirror to at least partially compensate the HEL beam for the calculated wavefront error.

2. The laser beam projection system according to claim 1, wherein the at least one processor is configured to control the deformable mirror to adjust a high intensity hitspot formed by the HEL beam on the remote object.

3. The laser beam projection system according to claim 1, further comprising:
   an HEL LO illumination source configured to produce HEL LO illumination derived from the output of the HEL MO or from an output of an HEL LO that is derived from the HEL MO output, and
   a Doppler-shifted HEL LO illumination source configured to produce Doppler-shifted HEL LO illumination derived from the HEL LO output and the Doppler shift data,
   wherein the focal plane array is configured to receive the Doppler-shifted HEL LO illumination and at least a portion of HEL return illumination that comprises the HEL beam reflected off the remote object, and
   wherein the light intensity data for at least some pixels of the focal plane array corresponds to interference of the Doppler-shifted HEL LO illumination with the HEL return illumination.

4. The laser beam projection system according to claim 3, wherein the at least one processor is configured to control the deformable mirror to alter a location of the HEL beam on the remote object based upon locations of the pixels where the light intensity data corresponds to the interference of the Doppler-shifted HEL LO illumination with the HEL return illumination.

5. The laser beam projection system according to claim 3, further comprising one or more fast steering mirrors configured to direct the HEL beam toward the remote object; wherein the at least one processor is further configured to control the one or more fast steering mirrors to alter a location of the HEL beam on the remote object based upon locations of the pixels where the light intensity data corresponds to the interference of the Doppler-shifted HEL LO illumination with the HEL return illumination.

6. The laser beam projection system according to claim 1, wherein the at least one processor is configured to control the deformable mirror to alter an intensity profile or a location of a high intensity hitspot formed by the HEL beam at an aim point on the remote object.

7. The laser beam projection system according to claim 1, wherein the at least one processor is configured to apply a sharpness algorithm to the image of the remote object to determine the wavefront phase profile of the return illumination.

8. The laser beam projection system according to claim 1, further comprising:
one or more fast steering mirrors configured to direct the HEL beam toward the remote object; and
a focus mechanism configured to focus the HEL beam onto the remote object.

9. The laser beam projection system according to claim 8, wherein the at least one processor is configured to control a tilt of the one or more fast steering mirrors and to control a focus setting of the focus mechanism to partially compensate the HEL beam for the calculated wavefront error.

10. The laser beam projection system according to claim 8, wherein the at least one processor is configured to decompose the wavefront error into separate tilt, focus and higher order components.

11. The laser beam projection system according to claim 10, wherein the at least one processor is configured to control the one or more fast steering mirrors according to the tilt component of the wavefront error, to control the focus mechanism according to the focus component of the wavefront error, and to control the deformable mirror according to the higher order components of the wavefront error.

12. The laser beam projection system according to claim 10, wherein the at least one processor is configured to control the deformable mirror according to the tilt, focus, and higher order components of the wavefront error.

13. A laser beam projection method, comprising:
using a flood illumination source, producing coherent flood illumination that is directed toward a remote object, the coherent flood illumination derived from an output of a master oscillator (MO);
using a local oscillator (LO) illumination source, producing LO illumination derived from an output of an LO, the LO output derived from the MO output;
receiving, at a Doppler sensor, the LO illumination and a first portion of return illumination that comprises the coherent flood illumination reflected off the remote object;
generating, based on an output of the Doppler sensor, Doppler shift data for a Doppler shift corresponding to a longitudinal velocity of the remote object relative to a coherent imaging system;
using a Doppler-shifted LO illumination source, producing Doppler-shifted LO illumination derived from the LO output and the Doppler shift data;
using a high energy laser (HEL) source, producing an HEL beam derived from an output of an HEL MO;
using a deformable mirror to direct the HEL beam from the HEL source toward the remote object;
receiving, at a focal plane array, a second portion of the return illumination and the Doppler-shifted LO illumination; and
using at least one processor:
receiving light intensity data from the focal plane array,
generating, based on the light intensity data, an image of the remote object,
determining a wavefront phase profile of the return illumination based on the image of the remote object,
calculating a wavefront error based on a comparison between the determined wavefront phase profile and a desired wavefront phase profile of the HEL beam on the remote object; and
controlling the deformable mirror to at least partially compensate the HEL beam for the calculated wavefront error.

14. The laser beam projection method according to claim 13, wherein controlling the deformable mirror adjusts a high intensity hit spot formed by the HEL beam on the remote object.

15. The laser beam projection method according to claim 13, further comprising:
using an HEL LO illumination source, producing HEL LO illumination derived from the output of the HEL MO or from an output of an HEL LO that is derived from the HEL MO output;
using a Doppler-shifted HEL LO illumination source, producing Doppler-shifted HEL LO illumination derived from the HEL LO output and the Doppler shift data; and
receiving, at the focal plane array, the Doppler-shifted HEL LO illumination and at least a portion of HEL return illumination that comprises the HEL beam reflected off the remote object,
wherein the light intensity data for at least some pixels of the focal plane array corresponds to interference of the Doppler-shifted HEL LO illumination with the HEL return illumination.

16. The laser beam projection method according to claim 15, further comprising:
calculating an offset between the pixels of the focal plane array corresponding to the interference of the Doppler-shifted HEL LO illumination with the HEL return illumination and the pixels corresponding to a location of a desired aim point on the remote object, and
controlling the deformable mirror to minimize the calculated offset.

17. The laser beam projection method according to claim 13, wherein controlling the deformable mirror alters an intensity profile or a location of a high intensity hitspot formed by the HEL beam at an aim point on the remote object.

18. The laser beam projection method according to claim 13, wherein a sharpness algorithm is applied to the image of the remote object to determine the wavefront phase profile of the return illumination.

19. The laser beam projection method according to claim 13, further comprising:

using one or more fast steering mirrors to direct the HEL beam toward the remote object; and using a focus mechanism to focus the HEL beam onto the remote object.

20. The laser beam projection method according to claim 19, further comprising:

using the at least one processor to control a tilt of the one or more fast steering mirrors and to control a focus setting of the focus mechanism to partially compensate the HEL beam for the calculated wavefront error.

21. The laser beam projection method according to claim 19, further comprising:

using the at least one processor to decompose the wavefront error into separate tilt, focus and higher order components.

22. The laser beam projection method according to claim 21, further comprising:

using the at least one processor to control the one or more fast steering mirrors according to the tilt component of the wavefront error, to control the focus mechanism according to the focus component of the wavefront error, and to control the deformable mirror according to the higher order components of the wavefront error.

23. The laser beam projection method according to claim 21, further comprising:

using the at least one processor to control the deformable mirror according to the tilt, focus, and higher order components of the wavefront error.

24. The laser beam projection method according to claim 15, further comprising:

calculating an offset between the pixels of the focal plane array corresponding to the interference of the Doppler-shifted HEL LO illumination with the HEL return illumination and the pixels corresponding to a location of a desired aim point on the remote object, and controlling one or more fast steering mirrors configured to direct the HEL beam toward the remote object to minimize the calculated offset.

25. A laser beam projection system, comprising:

a flood illumination source configured to produce coherent flood illumination;

a local oscillator (LO) illumination source configured to produce LO illumination;

a Doppler sensor configured to receive the LO illumination and a first portion of return illumination that comprises the coherent flood illumination reflected off a remote object;

a Doppler-shifted LO illumination source configured to produce Doppler-shifted LO illumination based on Doppler shift data, the Doppler shift data based on a longitudinal velocity of the remote object relative to the laser beam projection system;

a high energy laser (HEL) source configured to produce an HEL beam;

a deformable mirror configured to direct the HEL beam toward the remote object;

a focal plane array configured to receive a second portion of the return illumination and the Doppler-shifted LO illumination; and at least one processor configured to:

generate, based on an output of the focal plane array, an image of the remote object;

determine a wavefront phase profile of the return illumination based on the image;

calculate a wavefront error based on a comparison between the determined wavefront phase profile and a desired wavefront phase profile; and control the deformable mirror to at least partially compensate the HEL beam for the calculated wavefront error.

* * * * *